May 19, 1942.   E. F. KOHL   2,283,267
CLUTCH AND MECHANISM FOR EFFECTING AXIAL MOVEMENT OF A DRIVEN MEMBER
Filed Nov. 22, 1939   3 Sheets-Sheet 1

INVENTOR
EVERARD F. KOHL
BY
Hyde and Meyer
ATTORNEYS

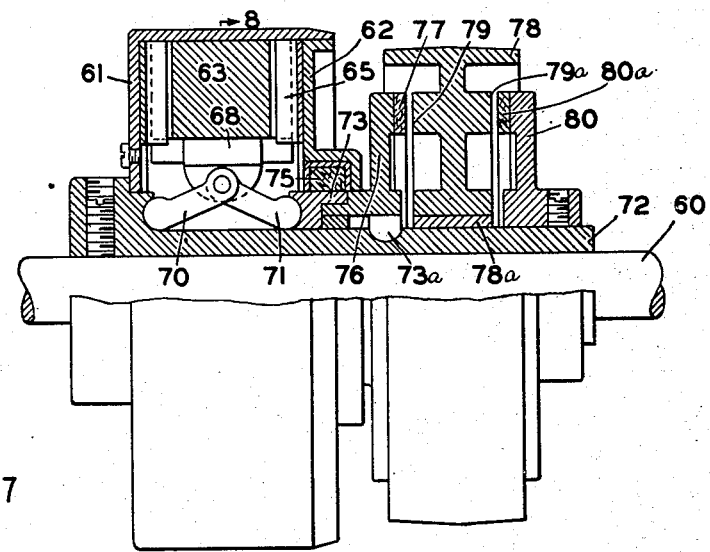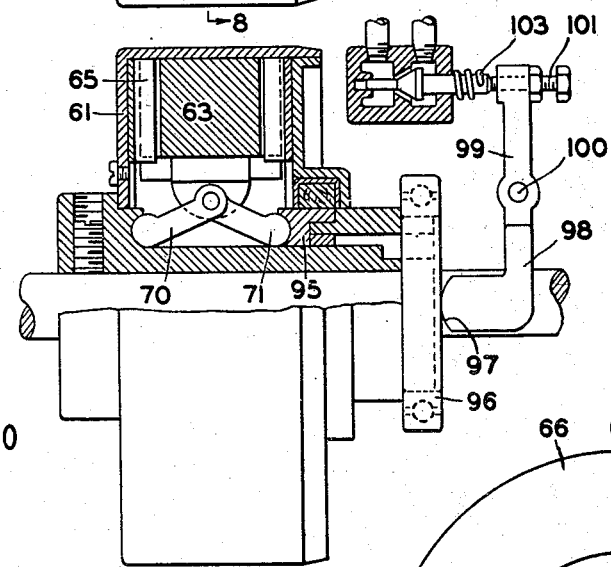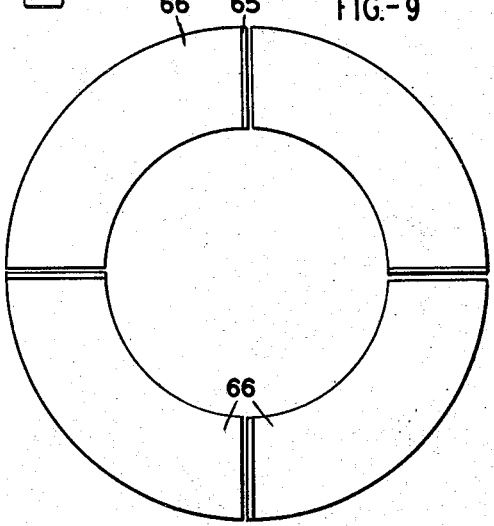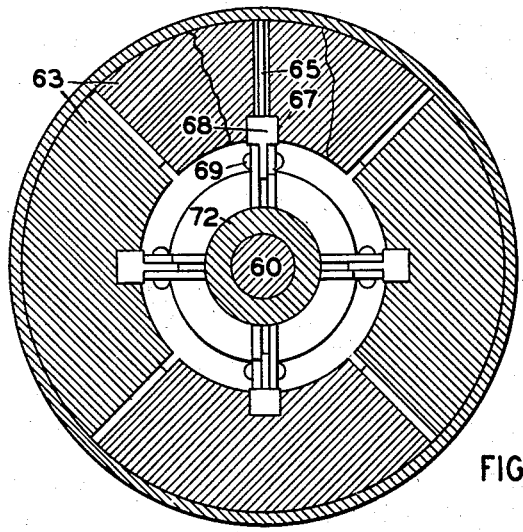

Patented May 19, 1942

2,283,267

UNITED STATES PATENT OFFICE 2,283,267

CLUTCH AND MECHANISM FOR EFFECTING AXIAL MOVEMENT OF A DRIVEN MEMBER

Everard F. Kohl, Cleveland, Ohio

Application November 22, 1939, Serial No. 305,626

26 Claims. (Cl. 74—230.17)

My invention relates to improved means for effecting axial movement of a driven member by means of a rotatable driving member. More particularly, it relates to a pulley of the V-groove type which is automatically adjustable in accordance with the rotative speed of its driving member.

My invention also relates to the combination of a driving pulley of the V-groove type and a driven pulley of the same type connected together by suitable transmission means, said pulleys being self-alining and being adjustable in such a manner that the ratio of transmission between the driving pulley and the driven pulley will vary in accordance with the rotative speed of the driving pulley.

In transmitting power at different ratios from a primary shaft to a driven shaft, it has heretofore been the practice to provide a V-shaped pulley of the split type on the driving shaft, one of the driving disks of which is adjustable by means of a spring to provide transmission of power from the driving pulley to the driven pulley at different ratios. In such cases, however, it is necessary to utilize a smooth pulley on the driven shaft to provide proper transmission alinement and to adjust the position of the driving pulley or provide other suitable means for adjusting the belt between the pulleys to provide the proper tautness.

It is the aim of the present invention to provide improved means for imparting axial and rotative movement to a pulley of the split type and to also impart axial movement to one or both parts of the split pulley. In a broader sense, however, my invention contemplates improved means for translating the rotative movement of the driving member into axial movement of a member to be driven for any desired purpose, such as for moving a clutching member or for operating a lever for controlling valves or the like.

It is therefore an object of my invention to provide improved apparatus for effecting axial movement of a driven member from power transmitted from a rotatable driving member.

Another object of my invention is to provide an improved pulley having mating parts, at least one of which is adjustable toward the other mating part as the rotative speed of its driving means increases.

A further object of my invention is to provide an improved pulley of the V-groove type having mating parts which are adapted to be adjusted away from each other by transmission means inserted between them and which are automatically adjustable toward each other to raise the transmission means in the V-shaped groove as the speed of its driving member increases.

Another object of my invention is to provide an improved apparatus including a driving member and a driven member in which the driven member may be rotated from power transmitted by the driving member and in which the driven member is movable axially with respect to the driving member.

A still further object of my invention is to provide an improved combination including a driving pulley, a driven pulley and transmission means in which power is adapted to be transmitted from the driving pulley to the pulley to be driven at various ratios in accordance with the speed of a driving member.

Other objects and advantages of my invention will be apparent as the specification proceeds.

My invention will be better understood by reference to the accompanying drawings in which Fig. 1 is a composite view of one form of my improved pulley, the lower part of the view being a side elevation and the upper part being a central longitudinal section;

Fig. 7 is a composite view, partly in elevation and partly in section, of a centrifugally operated clutch and a pulley of the smooth type showing means for imparting axial movement to a member for effecting a clutching engagement;

Fig. 8 is a cross sectional view on the line 8—8 of Fig. 7, with parts broken away to show adjacent structure;

Fig. 9 is an elevational view of the lining for the housing; and

Fig. 10 is a composite view, partly in elevation and partly in section, of a centrifugally operated housing and an elevational view of an actuating device, showing means for imparting axial movement to a driven member for moving the actuating device.

In accordance with my invention a split pulley of the V-groove type is provided in which at least one of the parts is adjustable toward and away from the other part. As shown, one of the parts is adjustable away from the other part or both parts are adjustable away from each other by the force of a transmission means. When the driving member for the pulley, however, is driven at a predetermined speed, at least one of the parts of the pulley is adjusted toward the other part in accordance with the speed of the driving member, thus raising the transmission means in the V-shaped groove and providing means for changing the ratio of power transmitted by the driving pulley as the speed of the driving member increases.

Figure 1:
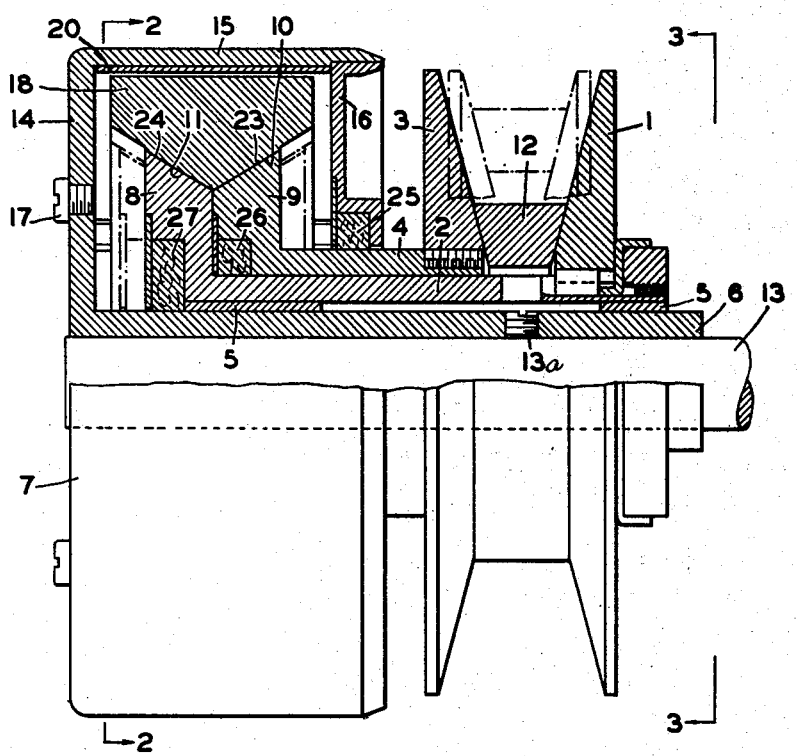
Figure 2:
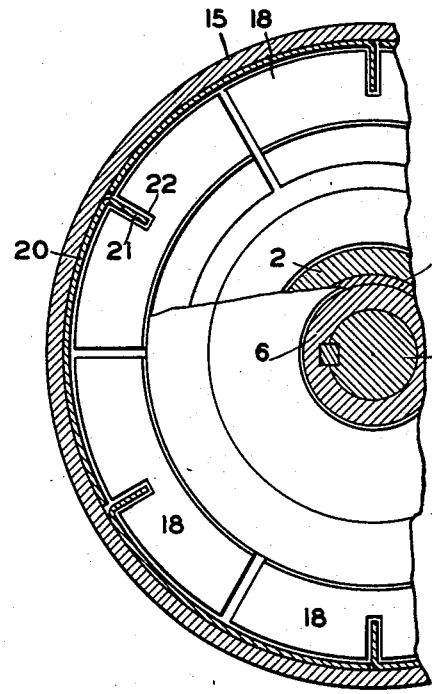
Fig. 2 is a cross sectional view on the line 2—2 with parts broken away to show adjacent structure.
Figure 3:
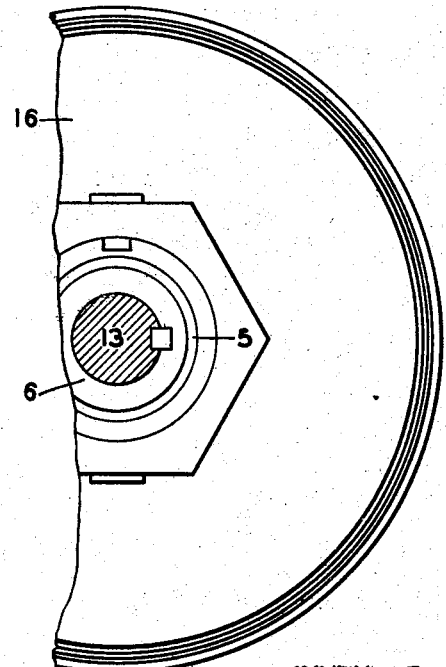
Fig. 3 is an end view of the pulley as seen from a plane passing through the line 3—3, looking in the direction of the arrows.

While various means may be provided for driving the pulley and adjusting at least one of the parts of the pulley toward the other, Figs. 1, 2 and 3 illustrates one form of my invention in which a split pulley of the V-groove type is shown including a part 1 adapted to be driven by a shaft 2 and a mating part 3 adapted to be driven by a shaft 4. The shaft 2 is rotatably and slidably mounted upon bearings 5 supported by a shaft 6 connected to a housing 7 and shaft 4 is rotatably and slidably mounted upon shaft 2. The free ends of shafts 2 and 4 extend within housing 7 and are provided with outwardly extending peripheral flanges 8 and 9, respectively, the upper portions of which form clutch surfaces and are inclined outwardly as indicated by the numerals 10 and 11 in opposite directions from a plane passing between the adjacent sides of flanges 8 and 9.

The mating parts of the pulley are adapted to be adjusted away from each other by the force of a transmission means 12 inserted between the pulleys. When the housing, however, is rotated at a predetermined speed, means are provided to drive the pulley parts and adjust them toward each other. While the housing 7 may be rotated by any desirable means, as shown in the drawings, a shaft 13 is provided that may be rotated by any desired prime mover, such as an electric motor, and which is keyed to the housing shaft 6 and prevented from longitudinal movement with respect thereto by any suitable means, such as a set screw 13a.

As shown in the drawings, the housing consists of a side wall 14 provided with a peripheral flange 15 and a cover 16 and is adapted to contain a heavy liquid, such as mercury, which may be inserted through suitable openings, normally closed by plugs 17. Mercury is preferred because it has a relatively high specific gravity and is stable under ordinary conditions. Associated with the housing are a plurality of clutch members 18 having a lower specific gravity than the liquid which are preferably formed of a suitable molded composition, such as asbestos fibers bound together by a phenolic condensation product. The clutch members 18 are adapted to be driven by the housing 7 and while any suitable means may be provided for this purpose, such as projections extending radially inward from the housing or a lining having radially extending flanges, as shown in the drawings, the housing is provided with an interior lining consisting of a plurality of arcuate shaped members 20 each of which is provided with an inwardly extending flange 21 which is adapted to be received in a groove 22 formed in each of the clutch members.

As explained more fully in Patent No. 1,972,741 granted to me on September 4, 1934, when the housing is operated at a predetermined speed depending upon the amount of mercury in the housing and the material of which the clutch members are formed, the drag upon the mercury will cause it to be gradually picked up by the driving member and as the speed increases the mercury will assume the form of an annulus in the peripheral portion of the interior of the housing and the buoyant force of the mercury when it is thus rotated with the driving member will press the clutch members radially inwardly against clutch surfaces 10 and 11 formed on flanges 8 and 9 of driving shafts 2 and 4, thus causing rotation of the pulleys 1 and 3.

For the purpose of adjusting the mating parts 1 and 3 of the pulley toward each other, the lower portion of each of the clutch surfaces is bevelled inwardly from opposite sides forming inclined surfaces 23 and 24 which are adapted to engage clutch surfaces 10 and 11. As the speed of the housing is increased and the clutch members are forced inwardly, the inclined surface 23 of each clutch will engage the inclined clutch member surface 10, forcing shaft 4 outwardly from the housing and the inclined surface 24 of each clutch member will engage the inclined clutch surface 11 forcing shaft 2 inwardly. It will therefore be seen that as the speed of the housing increases the mating parts 1 and 3 of the pulley will not only be driven in unison but the parts will be adjusted toward each other. Sealing means 25 are provided to prevent the escape of mercury between the member 16 and shaft 4 and in a like manner sealing means 26 and 27 are provided to prevent mercury from flowing between shafts 4 and 2 and between the shaft 2 and bearings 5.

Clutch members 18 and flanges 8 and 9 on shafts 2 and 4 are also constructed and arranged to permit axial movement of the mating parts 1 and 3 in unison upon shaft 6. For this purpose clutch members 18 are of considerably less width than the distance between the side 14 and cover 16 as shown in Fig. 1. The entire assembly including clutch members 18, flanges 8 and 9, and mating parts 1 and 3 may therefore be moved in unison axially upon shaft 6, either to the left or right from the position shown in Fig. 1. This arrangement is of particular importance in providing proper alinement when the pulley is utilized in combination with a driven pulley of the split type in which one part of the pulley is fixed to a shaft and the other part is adjustable toward and away from the fixed part.

Figure 4:
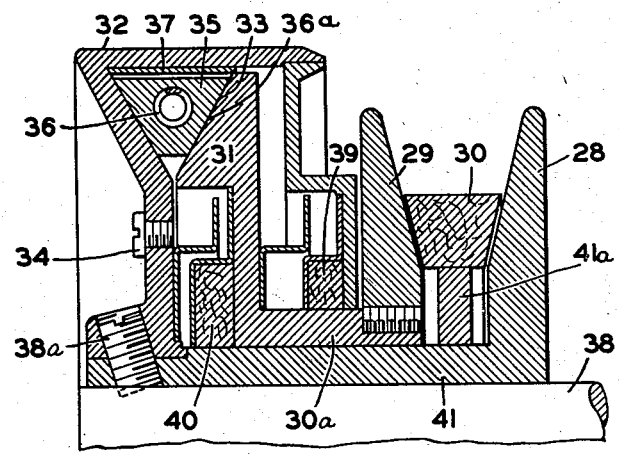
Fig. 4 is a cross sectional view of the upper part of another form of my improved pulley and a side elevational view of a driving shaft to which it is attached.

Fig. 4 of the drawings illustrates another form of my invention. In this figure a pulley having mating parts 28 and 29 is provided, the part 29 being adjustable away from its mating part 28 by the force of transmission means 30 and being adjustable toward the part 28 in accordance with the speed of rotation of the driving member. The part 29 of the pulley is driven by the shaft 30a which extends into a rotatable housing 32 and is provided with a peripheral flange 31 having a downwardly inclined annular clutch surface 33.

The housing 32 is adapted to contain a heavy liquid, such as mercury, which may be inserted into the housing through openings, normally closed by suitable plugs 34. Arranged within the housing 32 are a plurality of clutch members 35 which are normally held in engagement with the interior periphery of the housing by springs 36 interposed between the clutch members and the ends of which are adapted to extend into sockets formed therein in the manner shown in Fig. 5. Means are also provided to rotate the clutch members with the housing. For this purpose, the housing may be provided with a lining 37 having inwardly extending flanges or the interior lining may be, and preferably is formed in the manner shown in Fig. 2.

While the housing 32 may be rotated by any desirable means, such as a pulley or the like, as shown in the drawings it is attached to a shaft 38 by any suitable means such as a set screw 38a. As the speed of the housing 32 increases the buoyant effect of the mercury will force the clutch members 35, each of which is provided with an inclined surface 36a, into engagement with the clutch surface 33 on flange 31 and a driving connection will be established between the rotatable housing and the shaft 30a which rotates the part 29 of the pulley in unison with the part 28 which is operatively associated with the shaft 38. As the speed of the housing 32 increases, and clutch members 35 are moved radially inwardly by the buoyant force of the mercury acting against the force of springs 36, shaft 30a is moved outwardly to adjust the part 29 of the pulley toward the part 28, thus raising the transmission means 30 in the V-shaped groove and providing a different ratio of transmission between the driving pulley and a pulley which is to be driven. Appropriate sealing means 39 and 40 are provided to prevent the escape of the mercury from the housing and between shaft 30a and a shaft 41 which is connected to or is integral with pulley part 28. An idler wheel 41a may also be provided to support the transmission belt when it reaches the bottom of the V-shaped groove formed by the mating parts of the pulley.

Figure 5:
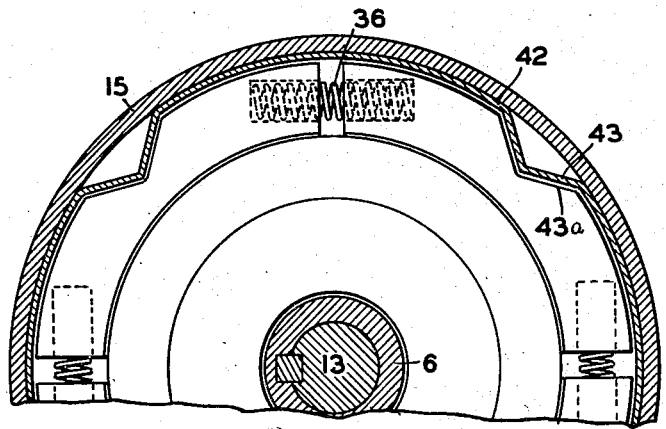
Fig. 5 is a cross sectional view similar to the lower portion of Fig. 2 showing a modified form of means for effecting a driving connection between the driving member and the driving pulley.

Fig. 5 of the drawings illustrates a modified form of my invention showing means for forcing the clutch members into engagement with the clutch surfaces. As shown, the lining 42 is provided with angular shaped indentations 43 which are adapted to engage similar indentations 43a formed in the outer surface of the clutch members to exert an inward force upon the clutch members during the rotation of the housing and particularly after the clutch members have been moved radially inwardly by the mercury into engagement with the clutch surfaces.

Figure 6:
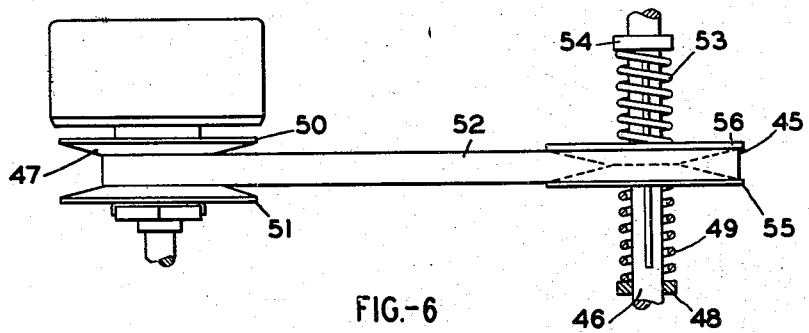
Fig. 6 is a plan view of my improved pulley showing it operatively connected with a pulley on an external shaft to be driven.

Fig. 6 of the drawings illustrates the combination of my improved adjustable pulley with a driven pulley 45 slidably fixed upon an exterior shaft 46. As shown in the drawings, the driving pulley designated by the numeral 47 may be of the type shown in Fig. 1 or of that shown in Fig. 4 and the pulley 45 to be driven may be either of the ordinary nonseparable type or of a type in which the parts, or at least one part of the pulley is adjustable away from and toward the other part.

Assuming that pulley 45 is of the usual nonseparable type and that the part 50 of pulley 47 is adjustable toward the part 51 as shown in Fig. 4 of the drawings, as the part 50 of pulley 47 is adjusted toward the part 51 by an increase in speed of rotatable housing 32, means are provided to slide driven pulley 45 in the same direction to provide proper alinement of the transmission means. For this purpose the shaft 46 is provided with a nut 48 and a spring 49 is interposed between the nut 48 and the pulley 45 and as part 50 of pulley 47 is adjusted toward part 51, the transmission means 52 shown in the form of a belt slides pulley 45 in the same direction against the force of spring 49. The action of the transmission means may be assisted in such a case by a spring 53 interposed between the opposite side of the pulley and a nut 54 secured to shaft 46. In such a case it is necessary to provide sufficient slack in the transmission 52 to compensate for the tightening of the belt when the part 50 is adjusted toward the part 51 and to provide means to tighten the transmission means as the speed of housing 32 decreases.

In the preferred form of my invention, however, pulley 45 is of the split type having mating parts 55 and 56 which are adjustable toward and away from each other. In such case the driving and driven pulleys are automatically adjustable and self-alining. Assuming, for instance, that the driving pulley 47 is of the type shown in Fig. 4, as the adjustable part 50 is moved toward its mating part 51, the belt 52 is moved upwardly in the V-shaped groove, thereby tightening belt 52. As the tension upon belt 52 increases, it forces the part 55 of driven pulley 45 toward the nut 48 against the action of spring 49, thereby increasing the rotative speed of driven shaft 46. On the other hand, when the speed of the rotative housing 32 is decreased, the force of the transmission means 52 will force the adjustable part 50 of pulley 47 away from the mating part 51 and spring 49 will then become effective, assisted by transmission means 52 in alining pulley 45 to correspond to the new position of the transmission belt and springs 53 and 49 acting upon the parts 55 and 56 of pulley 45 will force the belt 52 upwardly in the V-shaped groove formed by mating parts 55 and 56. The ratio at which power is transmitted from the driving pulley to the driven pulley is therefore changed.

If the pulley 47 is of the type shown in Fig. 1 in which both parts of the pulley are adjustable toward each other and the pulley 45 is of a similar type, as the speed of pulley 47 increases the transmission means 52 rises in the V-shaped groove in pulley 47, thus tightening the transmission means. As the transmission means tightens, however, it forces the part 56 of pulley 45 toward the nut 54 against the action of spring 53 and the part 55 is forced toward the nut 48 against the action of spring 49, thus permitting the belt to sink lower in the groove formed by the mating parts 55 and 56 of pulley 45. On the other hand as the rotative speed of the housing 7 decreases, the mating parts 50 and 51 of pulley 47 are forced away from each other by the transmission belt, thus relieving the tension on the belt, whereupon springs 49 and 53 move mating parts 55 and 56 of driven pulley 45 toward each other and raise the transmission belt in the groove formed by those parts, thus changing the ratio of transmission. Means are thus provided to vary the ratio of transmission in accordance with the speed of the driving pulley while maintaining the pulleys in alinement with each other.

When a driving pulley 47 of the type shown in Fig. 1 is utilized, the ratio of transmission may be varied in accordance with the speed of the driving pulley and the pulleys may be automatically maintained in alinement even though one of the mating parts 55 or 56 is fixed to shaft 46 in which case the spring abutting the fixed part of the pulley may be omitted. For instance, assuming that part 56 is fixed to shaft 46, as the speed of the driving pulley increases, parts 50 and 51 are forced toward each other, thus raising the transmission belt in the V-shaped groove of pulley 47 and tightening the belt. As the belt tightens, part 55 of pulley 45 will be forced toward nut 48 against the action of spring 49, and the transmission belt acting upon pulley 47 will force the entire assembly, including shafts 2 and 4 and clutch elements 18 axially to the right upon shaft 6 as shown in Fig. 1.

Broadly considered, my invention is applicable to many different types of driven members to which an axial movement or force may be imparted by the buoyant force of the centrifugally-influenced liquid. By way of example, in Figs. 7, 8 and 9 there is shown, as a modified form of the invention, a construction for imparting axial movement to a clutch member upon radial displacement of clutching elements through the centrifugally-developed buoyant force of a heavy liquid, such as mercury. Mounted on the drive shaft 60, and keyed to rotate therewith is a hollow rotatable housing 61 adapted to contain a predetermined quantity of mercury. The housing is suitably closed and sealed by an annular cover member 62 which may be secured thereto by any suitable means, such as welding. A plurality of radially movable segmental blocks 63 are disposed annularly within the housing and have a limited radial movement between the outer wall and the inner sleeve 72. For the purpose of driving the segmental blocks and preventing their relative movement with respect to the housing, each block is centrally grooved at opposite sides to provide for loose engagement with inwardly disposed flanges 65 extending inwardly from arcuate shaped members 66 which are welded or otherwise secured to one side and the cover of the housing.

According to my invention, means are provided for translating the radial displacement of the blocks 63 into axial movement and for transmitting same to the engaging surfaces of a clutch. As shown, the inner portion of each clutch block is provided with a recess 67 which is adapted to receive the outer portion of a thrust member 68, the inner portion of which extends below the clutch members and is provided with a pin 69 to which the outer ends of a pair of oppositely inclined links 70 and 71 are loosely connected, the free ends of which links lie upon the periphery of sleeve 72 surrounding shaft 60. It will be clear that inward radial movement of the segmental blocks will carry the pins 69 inwardly and cause the links 70 and 71 to exert an axial displacing force.

An axially movable clutching member 73 is slidably mounted on sleeve 72 as by a key 73a which engages a suitable axial keyway in the sleeve. The inner or left hand portion of member 73 extends parallel to the sleeve 72 and has abutting engagement with the free end of link 71. Suitable sealing means 75 may be provided at the end of the clutch member 73 to prevent leakage of mercury. The outer or right hand portion of member 73 is flanged to provide an increased diameter and the outer rim portion 76 thereof is faced with suitable clutching or friction material 77. A pulley 78 (or any other member which it is desired to drive by means of the clutch) is mounted on a bearing 78a for free rotation about sleeve 72 and said bearing is slidable along the sleeve. Clutch engaging members 79 and 79a are provided on opposite faces of the pulley hub, the surface of member 79 being adapted to have mating clutch engagement with the surface of frictional material 77. On the opposite side of the pulley there is provided a normally disengaged clutch member 80, provided with suitable clutching or friction material 80a. Clutch member 80 is fixed to rotate with sleeve 72 and to engage with the clutch engaging member 79a when axial movement of the member 76 causes the pulley to slide to the right. If desired, suitable means, such as a spring, may be provided for urging the pulley to a central disengaged position when the clutching force is diminished.

Another modification of my invention is shown in Fig. 10 of the drawings. The apparatus shown in this modification is similar to that shown in Figs. 7, 8 and 9 with the exception that instead of utilizing an axial movable clutch member, an axially movable annular sleeve 95 is provided which is adapted to move an actuating device for any desirable purpose, such as for closing a valve. As illustrated, the axially movable member 95 is connected to a collar 96 and as collar 96 is moved axially it is adapted to engage faces 97 on the oppositely extending arms 98 of a lever 99 mounted on a stationary pivot 100 and the opposite end of which lever is provided with a threaded pin 101 which as shown is adapted to actuate and close a normally open valve against the force of spring 103.

The operation of the apparatus disclosed in Figs. 7 to 11 inclusive, is similar to that show in Figs. 1 to 6 inclusive. Briefly stated, the rotation of the housing containing a heavy liquid such as mercury, causes inward movement of the segmental blocks by the buoyant effect of the mercury and the blocks acting upon thrust member 68 force clutch member 73 or sleeve 95 outwardly. The axial movement of clutch member 73 forces the face 77 of clutch member 76 into engagement with the clutch surface 79 of pulley 78, moving the pulley to the right as shown in Fig. 7 and forcing clutch face 79a into engagement with the clutch surface 80a of clutch member 80, thereby providing driving engagement between the pulley and the driving shaft. When driving shaft 60 comes to rest the axial pressure upon clutch member 76 is released and is moved out of engaging contact with pulley 78 by any suitable means, such as springs.

In the apparatus shown in Fig. 10, upon axial movement of collar 96 against faces 97 of lever 99, the lever is oscillated on its pivot 100. When driving member 60 comes to rest the parts may be returned to their original position by action of the spring 103 which normally holds the valve in open position. The apparatus shown in Fig. 10 may therefore be utilized as a governor.

What I claim is:

1. Apparatus of the class described, comprising a driving member including a housing containing a liquid, a pulley having mating parts, one of the mating parts of said pulley being adjustable toward and away from the other mating part, a driving shaft for the adjustable part of said pulley extending into said housing and provided with a clutch surface and means associated with said housing and operable by said liquid during the rotation of said housing for effecting a driving connection between the driving member and said clutch surface, said means and said clutch surface being so constructed and arranged that said means is effective in forcing the driving shaft carrying the adjustable part of said pulley axially toward its mating part in accordance with the speed of rotation of said housing.

2. Apparatus of the class described, comprising a driving member including a rotatable housing containing a liquid, a pulley having mating parts, one of the mating parts of said pulley being adjustable toward and away from the other mating part, a driving shaft for the adjustable part of said pulley extending into said housing and provided with an inclined clutch surface and a clutch member associated with said housing said clutch member having an inclined surface arranged in said housing and being operable by said liquid during the rotation of said housing for effecting a driving connection between said housing and said clutch surface, the inclined portion of said clutch member being adapted to engage the inclined portion of said clutch surface and force the driving shaft carrying the adjustable part of the pulley axially toward the mating part of the pulley as the speed of rotation of said housing is increased.

3. Apparatus of the class described, comprising a driving member including a rotatable housing containing a liquid, a pulley having mating parts, means for driving the parts of said pulley including a member extending into said housing and having a clutch surface and a clutch member arranged in said housing, said clutch member being rotatable with said housing and being movable radially inwardly into engagement with said clutch surface by said liquid during the rotation of said housing.

4. Apparatus of the class described, comprising a driving member including a rotatable housing containing a liquid, a pulley having mating parts, means for driving said parts including a driving shaft operatively connected with each part, the free end of each of said shafts being extended into said housing and having a clutch surface, and a clutch member arranged in said housing, said clutch member being rotatable with said housing and being movable radially inwardly into engagement with said clutch surfaces by said liquid during the rotation of said housing.

5. Apparatus of the class described, comprising a driving member including a rotatable housing containing a liquid, a pulley having mating parts, at least one of said parts being adjustable toward and away from the other part, means for driving said parts including a driving shaft operatively connected to the adjustable part, the free end of said shaft being extended into said housing and having an inclined clutch surface, a clutch member arranged in said housing and rotatable therewith and being movable radially inwardly into engagement with said clutch surface by said liquid during the rotation of said housing to impart rotative movement to said shaft, said clutch member having an inclined portion which engages the inclined portion of said clutch surface and forces the adjustable part of said pulley axially toward its mating part during the rotation of said housing.

6. Apparatus of the class described, comprising a driving member including a rotatable housing containing a liquid, a pulley having mating parts shaped to provide a V-shaped groove adapted to receive a transmission means, at least one of said parts being adjustable toward and away from the other part, means for driving said parts including a driving shaft operatively connected to the adjustable part, the free end of said shaft being extended into said housing and having an inclined clutch surface, a clutch member arranged in said housing and rotatable therewith and being movable radially inwardly into engagement with said clutch surface by said liquid during the rotation of said housing to impart rotative movement to said shaft, said clutch member having an inclined portion which engages the inclined portion of said clutch surface and moves said shaft axially toward its mating part during the rotation of said housing.

7. Apparatus of the class described, comprising a driving member including a rotatable housing containing a liquid, a pulley having mating parts, said parts being movable away from and toward each other, means for driving said pulley including a driving shaft operatively associated with each of said parts and having a portion extending into said housing having an inclined clutch surface, a clutch member arranged in said housing and rotatable therewith, said clutch member being movable radially inwardly by said liquid during the rotation of said housing and having inclined surfaces, one of the inclined surfaces of said clutch member being adapted to engage the inclined surface of one of said clutch surfaces to draw one of the driving shafts inwardly and the other inclined surface of the clutch member being adapted to engage the other clutch surface and force the other driving shaft outwardly, thereby moving the mating parts of said pulley toward each other during the rotation of said housing.

8. Apparatus of the class described, comprising a driving member including a rotatable housing containing a liquid, a pulley having mating parts adapted to form a V-shaped groove for receiving a transmission means, said parts being movable away from and toward each other, means for driving said pulley including a driving shaft operatively associated with each part and having a portion extending into said housing provided with a clutch surface and a clutch member rotatable with said housing and movable radially inwardly by said liquid during the rotation of said housing, the clutch surface on one of said portions being inclined in one direction from a plane passing between the free end portions of said shafts and the other clutch surface being inclined at an angle from said plane in the opposite direction and said clutch member being provided with inclined surfaces to engage said clutch surfaces and being adapted to force the mating parts of said pulley toward each other against the force of said transmission means.

9. Apparatus of the class described, comprising a driving member including a rotatable housing containing a liquid, a pulley associated with said driving member having mating parts, one of which is adjustable toward and away from the other part, one of the parts of said pulley being adapted to be driven directly by said driving member and means for driving the other part of said pulley including a driving shaft operatively associated therewith and extending into said housing, and means associated with said driving shaft and said housing and being effective by the buoyant action of said liquid upon rotation of said housing for driving said shaft and adjusting it toward its mating part.

10. A clutch comprising a hollow rotatable driving member having a body of relatively heavy liquid therein, a clutch element of lesser density than said liquid and having buoyant contact therewith, a driven member axially movable with respect to the driving member, and means for transmitting to the driven member from the clutch element an axial movement imparted thereto by the centrifugally-developed buoyant force of the liquid.

11. A clutch comprising a hollow rotatable driving member having a body of relatively heavy liquid therein, a clutch element of lesser density than said liquid and having buoyant contact therewith, a driven member, and means for transmitting to the driven member from the clutch element an axial force imparted thereto by the centrifugally-developed buoyant force of the liquid.

12. Apparatus of the class described comprising a driving member including a rotatable housing containing a liquid, a pulley, means for driving said pulley including a shaft extending into said housing having a clutch surface and a clutch member arranged in said housing, said clutch member being rotatable with said housing and being movable radially inwardly into engagement with said clutch surface by said liquid during the rotation of said housing and said clutch member and said clutch surface being of less width than said housing, whereby said driven member and said clutch member may be moved axially in said housing.

13. A clutch comprising a hollow rotatable driving member having a body of mercury therein, a plurality of clutch members arranged in said housing, and means movable axially relative to said driving member by the buoyant displacing force of the mercury acting upon said clutch members during the rotation of said driving member.

14. A clutch comprising a hollow rotatable driving member having a body of relatively heavy liquid therein, a plurality of clutch members arranged in said housing of lower specific gravity than said liquid and having buoyant contact therewith during the rotation of said housing, said clutch members being displaceable radially inwardly by the centrifugally-developed buoyant force of the liquid, means for translating said inward movement axially with respect to said driving member, and a driven clutching member movable by said means.

15. Apparatus of the class described comprising a hollow rotatable housing having a body of liquid therein, a plurality of clutch members arranged in said housing and having buoyant contact with said liquid during the rotation of said housing, a driven member having a portion extending into said housing provided with a clutch surface, said clutch members being rotatable with said housing and being movable radially inwardly into engagement with said clutch surface during the rotation of said housing and said clutch members and the portion of the driven member provided with the clutch surface being of less width than said housing and being movable axially in unison.

16. Apparatus of the class described comprising a hollow rotatable driving member having a body of liquid therein, a plurality of clutch members of less density than said liquid arranged in said housing and having buoyant contact with said liquid during the rotation of said housing, a driven member having a portion extending into said housing provided with a clutch surface, said clutch surface and said clutch members being so shaped that an axial force is imparted to the driven member by the centrifugally-developed buoyant force of the liquid, and said clutch members and the portion of said driven member extending in said housing being of less width than said housing and being movable axially in unison.

17. Apparatus of the class described comprising a hollow rotatable driving member having a body of liquid therein, a plurality of clutch members of less density than said liquid arranged in said housing and having buoyant contact with said liquid during the rotation of said housing, a driven member, a second driven member, each of said driven members having a portion extending in said housing provided with a clutch surface, the clutch surfaces of said driven members and the surfaces of said clutch members being so shaped that opposite axial forces are transmitted to said driven members by the centrifugally-developed buoyant force of the liquid and said clutch members and said driven members being movable axially in unison.

18. Apparatus of the class described comprising a driving member including a rotatable housing containing mercury, a pulley having mating parts, means for driving said parts including a driving shaft operatively connected with each part, the free end of each of said shafts being extended into said housing and having an inclined clutch surface, a plurality of clutch members arranged in said housing, each of which has oppositely inclined clutch surfaces, said clutch members being rotatable with said housing and being movable radially inwardly into engagement with said clutch surfaces during the rotation of said housing, said clutch members and the clutch surfaces on said driving shafts being of less width than said housing and being shaped to impart axial movement in opposite directions to said shafts and said clutch members and said driving shafts being movable axially in unison in the same direction.

19. Apparatus of the class described comprising a driving shaft, a pulley mounted on said shaft having mating parts, each of which is adjustable away from and toward the other part, means associated with the parts of said pulley and said shaft and being effective upon rotation of said shaft at a predetermined speed for adjusting each of the mating parts of the pulley toward each other and the mating parts of said pulley being movable axially in unison in the same direction upon said shaft without changing their relative positions to each other.

20. In combination, a driving pulley of the V-groove type having mating parts, each of which is adjustable toward and away from the other part, a driven pulley of the V-groove type having mating parts, at least one part of which is adjustable away from and toward the other part, transmission means arranged between said pulleys, a support for the driven pulley, means including a shaft for rotating the driving pulley, means associated with said shaft and said driving pulley for automatically moving the mating parts of the driving pulley toward each other as the speed of said shaft increases, and the mating parts of said driving pulley being axially movable in unison upon said shaft in the same direction without changing their relative position to each other to permit alinement of the driving pulley with the driven pulley.

21. In combination, a driving pulley of the V-groove type having mating parts, each of which is adjustable toward and away from the other part, a driven pulley of the V-groove type having mating parts, at least one part of which is adjustable away from and toward the other part, a support for the driven pulley, resilient means for maintaining the adjustable part of the driven pulley in mating relation with the other part, a transmission belt arranged between said pulleys, means including a shaft for rotating the driving pulley, said transmission belt being adapted to adjust the mating parts of the driving pulley away from each other when said shaft is at rest or rotating at low speeds, means associated with said shaft and said driving pulley for automatically moving the mating parts of the driving pulley toward each other as the speed of said shaft increases, thereby increasing the tension on said belt sufficiently to move the adjustable part of the driven pulley away from its mating part against the force of its resilient means, and the mating parts of said driving pulley being axially movable in unison upon the driving shaft in the same direction without changing their relative position to each other to permit alinement of the driving pulley with the driven pulley.

22. Apparatus of the class described comprising a rotatable housing containing a liquid, a plurality of clutch members arranged in said housing and having buoyant contact with said liquid during rotation of said housing, a driven member having a portion extending into said housing provided with a clutch surface, said clutch members being displaceable radially inwardly by the centrifugally developed buoyant force of the liquid, and said clutch members and said driven member being movable axially in unison.

23. Apparatus of the class described comprising a hollow rotatable driving member containing a liquid, a plurality of clutch members having buoyant contact with said liquid during the rotation of said driving member, a driven member having an inclined clutch surface, said clutch members being movable radially in said housing and having inclined clutch surfaces for engagement with the clutch surface of said driven member.

24. Apparatus of the class described comprising a driving member including a rotatable housing containing mercury, a pulley having mating parts, means for driving the parts of said pulley including a member extending into said housing and having a clutch surface and a plurality of clutch members arranged in said housing, said clutch members being rotatable with said housing and being movable radially inwardly into engagement with said clutch surface by said mercury during the rotation of said housing.

25. Apparatus of the class described comprising a driving member including a rotatable housing containing a liquid, a pulley associated with said driving member having mating parts, at least one of which is adjustable toward and away from the other part, and means associated with said housing and being effective by the buoyant action of said liquid upon rotation of said housing for driving said pulley and moving its adjustable part toward its mating part.

26. Apparatus of the class described comprising a driving member including a rotatable housing containing a liquid, a pulley associated with said driving member having mating parts which are adjustable toward and away from each other, and means associated with said housing and being effective by the buoyant action of said liquid upon rotation of said housing for driving said pulley and adjusting the parts of the pulley toward each other.

EVERARD F. KOHL.